(12) United States Patent
Uno et al.

(10) Patent No.: US 10,050,482 B2
(45) Date of Patent: Aug. 14, 2018

(54) ELECTRIC MOTOR, COMPRESSOR INCLUDING THE SAME, AND METHOD OF MANUFACTURING ELECTRIC MOTOR

(71) Applicant: Mitsubishi Electric Corporation, Tokyo (JP)

(72) Inventors: Ryohei Uno, Tokyo (JP); Koji Masumoto, Tokyo (JP); Mariko Nagai, Tokyo (JP); Kazuyuki Yamamoto, Tokyo (JP); Yoshiyuki Terai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 353 days.

(21) Appl. No.: 14/894,833

(22) PCT Filed: Oct. 30, 2013

(86) PCT No.: PCT/JP2013/079372
§ 371 (c)(1),
(2) Date: Nov. 30, 2015

(87) PCT Pub. No.: WO2015/063877
PCT Pub. Date: May 7, 2015

(65) Prior Publication Data
US 2016/0118852 A1    Apr. 28, 2016

(51) Int. Cl.
*H02K 3/28* (2006.01)
*H02K 3/18* (2006.01)
*H02K 15/095* (2006.01)

(52) U.S. Cl.
CPC .............. *H02K 3/28* (2013.01); *H02K 3/18* (2013.01); *H02K 15/095* (2013.01)

(58) Field of Classification Search
CPC ........... H02K 3/28; H02K 3/18; H02K 15/095
See application file for complete search history.

(56) References Cited

U.S. PATENT DOCUMENTS 4,794,361 A * 12/1988 Young ................ H01F 27/2823
                                                           242/430
7,126,246 B2 * 10/2006 Izumi ...................... H02K 3/18
                                                           310/208
(Continued)

FOREIGN PATENT DOCUMENTS

DE    20 2007 007 580 U1    9/2007
EP         2 551 993 A1      1/2013
(Continued)

OTHER PUBLICATIONS

Extended European Search Report dated Jul. 19, 2017 issued in corresponding EP patent application No. 13896493.7.
(Continued)

*Primary Examiner* — Robert W Horn
(74) *Attorney, Agent, or Firm* — Posz Law Group, PLC

(57) ABSTRACT

In an electric motor, an n-th layer of windings includes: a first winding portion wound from a radially outer side of the stator to a radially inner side of the stator so as to form a gap dimensioned to one pitch or more of the windings at a preset position; and a second winding portion wound from the radially inner side of the stator to the radially outer side of the stator in a continuous manner from the first winding portion so as to fill in the gap, the second winding portion crossing the first winding portion. The gap is formed at a position that is at an intermediate portion of the tooth in a stator radial direction and that is a position at which the windings switch from the n-th layer to an (n+1)th layer.

4 Claims, 5 Drawing Sheets

(56) References Cited

U.S. PATENT DOCUMENTS

| | | | |
|---|---|---|---|
| 7,166,949 B2* | 1/2007 | Okada | H02K 3/522 310/194 |
| 8,058,766 B2* | 11/2011 | Hoshino | H02K 15/095 310/179 |
| 8,450,900 B2* | 5/2013 | Prand-Stritzko | H01F 5/00 310/208 |
| 2003/0052567 A1* | 3/2003 | Yonekura | H02K 21/16 310/254.1 |
| 2004/0245882 A1* | 12/2004 | Horie | H02K 3/325 310/194 |
| 2004/0263015 A1* | 12/2004 | Okada | H02K 3/522 310/194 |
| 2006/0033395 A1 | 2/2006 | Izumi et al. | |
| 2010/0163320 A1* | 7/2010 | Sagara | H02K 1/148 180/65.1 |
| 2010/0164320 A1 | 7/2010 | Prand-Stritzko | |
| 2016/0118852 A1* | 4/2016 | Uno | H02K 3/18 310/208 |

FOREIGN PATENT DOCUMENTS

| | | |
|---|---|---|
| JP | H11-220844 A | 8/1999 |
| JP | 2002-27694 A | 1/2002 |
| JP | 2003-333782 A | 11/2003 |
| JP | 2003-333783 A | 11/2003 |
| JP | 2005-12876 A | 1/2005 |
| JP | 2009-240010 A | 10/2009 |
| WO | 2005/101611 A2 | 10/2005 |

OTHER PUBLICATIONS

International Search Report of the International Searching Authority dated Feb. 4, 2014 for the corresponding International application No. PCT/JP2013/079372.

Office Action dated Aug. 2, 2017 issued in corresponding CN patent application No. 2013800786179 (and English translation).

Office Action dated Jun. 2, 2016 issued in corresponding AU patent application No. 2013404182.

Office Action dated Feb. 24, 2018 issued in corresponding CN patent application No. 201380078617.9 (and English translation thereof).

\* cited by examiner

ELECTRIC MOTOR, COMPRESSOR INCLUDING THE SAME, AND METHOD OF MANUFACTURING ELECTRIC MOTOR

CROSS REFERENCE TO RELATED APPLICATION

This application is a U.S. national stage application of International Application No. PCT/JP2013/079372 filed on Oct. 30, 2013, the disclosure of which is incorporated herein by reference.

TECHNICAL FIELD

The present invention relates to an electric motor, a compressor including the same, and a method of manufacturing an electric motor. More specifically, the present invention relates to a method of winding windings to be wound on an insulator.

BACKGROUND ART

A compressor to be used to compress refrigerant and the like includes, for example, a shell, which is an airtight container, a stator fixed on an inner peripheral surface of the shell, a rotor connected to a shaft and rotatably supported thereon, and a compression mechanism to which rotation of the rotor is transmitted via the shaft, the transmitted rotational power being used to compress refrigerant.

Note that, the stator includes an iron core formed by laminating a plurality of magnetic steel sheets, for example, an insulator formed of an insulating material such as a resin, and windings wound on the insulators. The windings are wound on the insulator in a plurality of layers. Various methods have been proposed as the winding method.

For example, a stator has been proposed that employs a winding method that effectively utilizes dead space formed between the windings of two adjacent cores (see, e.g., Patent Literature 1). The technology disclosed in Patent Literature 1 improves the winding space factor by employing a method of winding two adjacent cores asymmetrically to effectively utilize dead space.

As a method for suppressing positional deviation of a radially innermost part of the winding on, for example, it is conceivable to employ a method of winding two adjacent cores asymmetrically such as in the technology disclosed in Patent Literature 1, and then to form a wall from the windings of adjacent cores so as to prevent the position of the radially innermost winding from deviating.

Further, a stator has been proposed in which the windings are wound on the core while leaving a gap in any of the winding layers for accommodating the windings, and then the windings are wound while filling the gap (see, e.g., Patent Literatures 2 and 3). In Patent Literatures 2 and 3, during the winding of the outermost layer of the respective windings, the windings are wound in an inward direction from a radially outer side of the stator to a radially inner side of the stator while leaving a gap having a dimension equal to a preset pitch amount. Further, after the windings are wound inwards, the windings are wound in an outward direction from the radially inner side of the stator to the radially outer side of the stator so as to fill in the gap formed during the inward winding. Thus, in Patent Literatures 2 and 3, unwinding of the windings is suppressed by winding in both an inward direction and in an outward direction, which causes the windings on the outermost layer to cross each other.

CITATION LIST

Patent Literature

Patent Literature 1: Japanese Unexamined Patent Application Publication No. 2003-333783 (see, for example, paragraphs [0061]-[0066], FIG. 19 and FIG. 20)

Patent Literature 2: Japanese Unexamined Patent Application Publication No. 2005-12876 (see, for example, Abstract and FIG. 6)

Patent Literature 3: Japanese Unexamined Patent Application Publication No. 2009-240010 (see, for example, Abstract)

SUMMARY OF INVENTION

Technical Problem

With the method for suppressing unwinding of the windings using the technology disclosed in Patent Literature 1, the windings of adjacent cores serve as a wall for preventing unwinding, and hence a winding design is necessary that keeps the gap between the adjacent cores as close to zero as possible. As a result, consideration needs to be given to the wire diameters that are available in currently produced windings, the number of turns required by the winding design, manufacturing variation among windings, processing variation among windings, and other factors, and hence there is a problem in that the stator design becomes more complex.

In this case, for a winding that is sandwiched by a winding on the radially inner side and a winding on the radially outer side thereof, the winding position is determined by the winding on the radially inner side and the winding on the radially outer side, and hence the position of the winding is less susceptible to deviation. However, for the radially innermost winding, there is a winding on the radially outer side, but there is no winding on the radially inner side for determining the position of the innermost winding. In particular, when the windings are not wound as far as the radially innermost side of the core (insulator), the radially innermost winding is also separated from the wall on the radially innermost side of the core (insulator). As a result, with the technologies disclosed in Patent Literatures 2 and 3, when an external force or vibrations, for example, are applied on the stator, the position of the radially innermost winding may deviate to the radially inner side of the stator, which can cause the windings that have been wound to unwind.

Note that, in addition to the technologies disclosed in Patent Literatures 1 to 3, other methods for suppressing unwinding of the windings may include impregnating the core having the windings wound thereon with varnish, integrally molding the windings with the core by resin molding, and adhering the windings and the core to each other with an adhesive or the like. However, when those methods are used, there is a problem in that manufacturing costs are increased by the cost of the varnish, for example.

The present invention is directed to solving the above-mentioned problems. It is an object of the present invention to provide an electric motor capable of suppressing the unwinding of windings wound on an insulator while suppressing design complexity of a stator and suppressing an increase in manufacturing costs, a compressor including the electric motor, and a method of manufacturing an electric motor.

Solution to Problem

According to one embodiment of the present invention, there is provided an electric motor, An electric motor including a stator, the stator including a core, the core including a tooth on which a winding is wound at a preset pitch to form a plurality of layers of the winding, the winding of one of the layers being angled to the winding of another one of the layers adjacent to the one of the layers, wherein an n-th layer of the winding comprises: a first winding portion wound from a radially outer side of the stator to a radially inner side of the stator with a gap between one turn and another at a preset position, the gap being dimensioned to one pitch or more of the winding; and a second winding portion wound from the radially inner side of the stator to the radially outer side of the stator in a continuous manner from the first winding portion to fill in the gap, the second winding portion crossing the first winding portion, and the gap is at a position at an intermediate portion of the tooth in the radial direction of the stator, the position being a position at which the winding turns over from the n-th layer to an (n+1)th layer.

Advantageous Effects of Invention

The electric motor according to the one embodiment of the present invention has the above-mentioned configuration, and thus may suppress the unwinding of the windings wound on the insulator while suppressing design complexity of the stator and suppressing an increase in manufacturing costs.

DESCRIPTION OF EMBODIMENTS

An embodiment of the present invention is now described with reference to the drawings.

Embodiment

Figure 1:
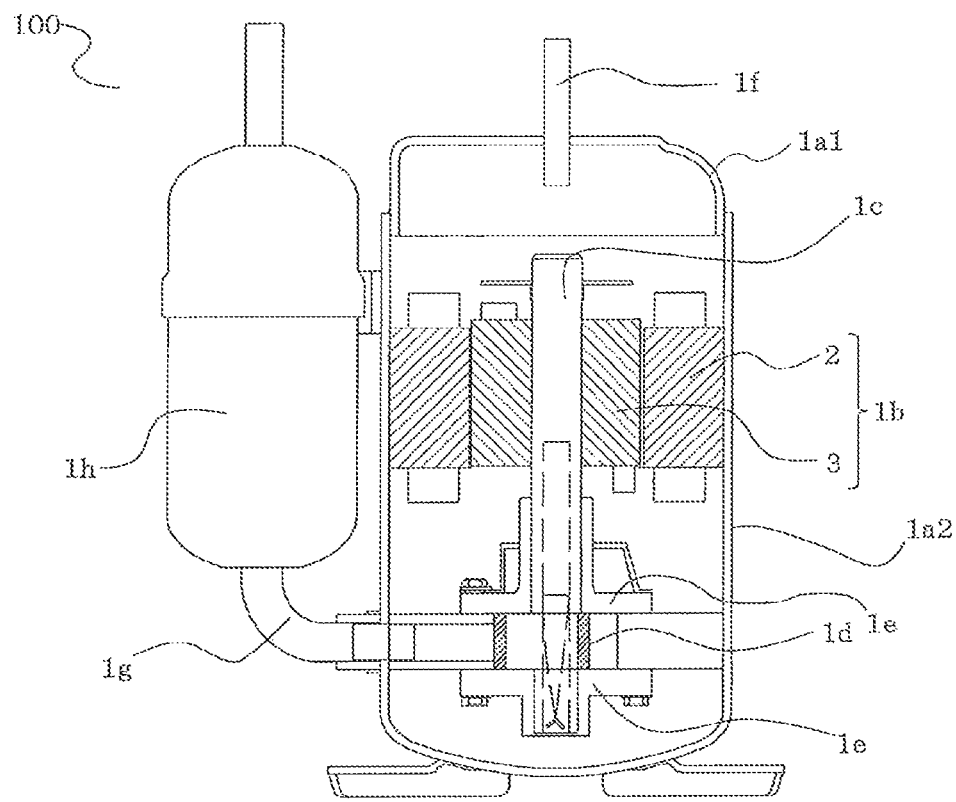
FIG. 1 is a schematic configuration example diagram of a compressor including an electric motor according to an embodiment of the present invention.
Figure 2:
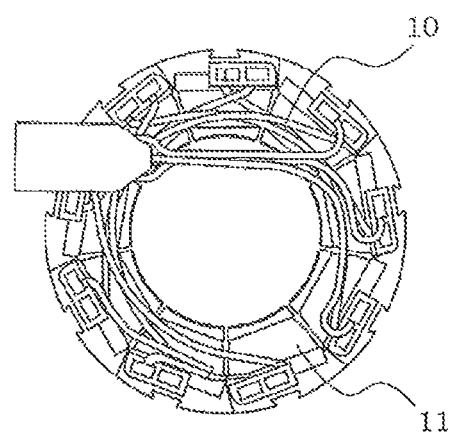
FIG. 2 is an illustration of a stator of the electric motor according to the embodiment of the present invention as viewed from above the stator.
Figure 3:
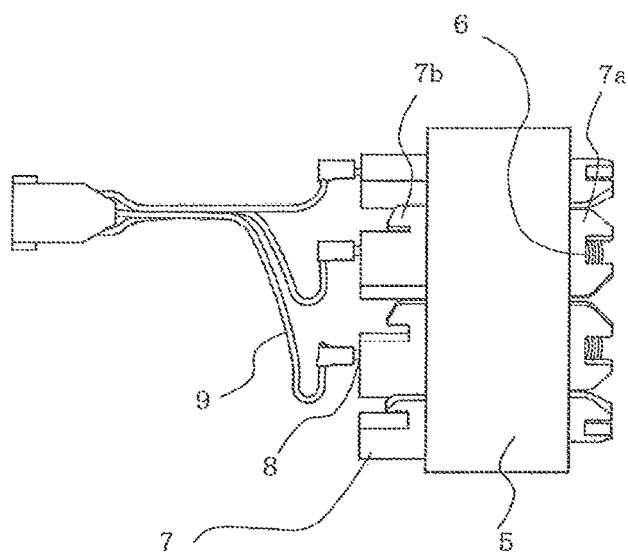
FIG. 3 is an illustration of the stator of the electric motor according to the embodiment of the present invention as viewed from the side of the stator.

FIG. 1 is a schematic illustration of exemplary configuration of a compressor 100 including an electric motor 1b according to an embodiment of the present invention. FIG. 2 is an illustration of a stator 2 of the electric motor 1b according to this embodiment as viewed from above the stator 2. FIG. 3 is an illustration of the stator 2 of the electric motor 1b according to this embodiment as viewed from the side of the stator 2.

The electric motor 1b according to this embodiment includes a modification that enables unwinding of winding (s) 6 wound on an insulator(s) 7 to be suppressed, while suppressing design complexity of the stator 2 and suppressing an increase in manufacturing costs (hereafter, windings 6 or insulators are referred to collectively as windings 6 or insulators 7, or may be referred to the winding 6 or the insulator 7 as a separate entity).

[Explanation of Configuration]

The compressor 100 includes an airtight container 1, a suction pipe 1g for supplying refrigerant into the airtight container 1, a fluid reservoir container 1h connected to the suction pipe 1g, a compression mechanism 1d connected to the suction pipe 1g, and configured to compress refrigerant, a shaft 1c configured to rotate, an electric motor 1b including a rotor 3, which is connected to the shaft 1c, and the stator 2 configured to rotate the rotor 3, and a discharge pipe 1f for discharging compressed refrigerant from the airtight container 1. In this embodiment, the compressor 100 is illustrated as an example of a rolling piston compressor.

(Airtight Container 1)

The airtight container 1 constitutes an external shell of the compressor 100. The airtight container 1 includes at least the compression mechanism 1d, the electric motor 1b, and other members. The airtight container 1 is formed of an upper shell 1a1 and a lower shell 1a2. The lower shell 1a2 forms the external shell of a body portion and a lower portion of the compressor 100. The upper shell 1a1 is an end portion-side shell (a shell at an end portion of the shell) forming an upper portion of the airtight container 1. The upper shell 1a1 has a bowl shape formed by drawing, for example. The discharge pipe 1f arranged to communicate the interior and the exterior of the airtight container 1 is connected to the upper shell 1a1. Further, although not shown in FIG. 1, a glass terminal that causes current to flow to the electric motor 1b is installed on the upper shell 1a1.

The lower shell 1a2, which forms an intermediate portion and a lower portion of the airtight container 1, has a bottomed tubular shape having a closed lower side, for example. In other words, the lower shell 1a2 has an opening on an upper side into which the upper shell 1a1 is press-fitted. The lower side of the lower shell 1a2 is closed, which allows refrigerating machine oil used to reduce the sliding friction of the compression mechanism 1d to accumulate in the lower shell 1a2. The suction pipe 1g configured to supply refrigerant into the airtight container 1 is connected to the lower shell 1a2. Further, the stator 2 of the electric motor 1b is mounted to an inner peripheral surface of the lower shell 1a2. The compression mechanism 1d is mounted to a lower side of the surface to which the stator 2 is mounted, namely, the inner peripheral surface of the lower shell 1a2.

(Suction Pipe 1g and Fluid Reservoir Container 1h)

One end of the suction pipe 1g is connected to the lower shell 1a2 of the airtight container 1 so as to be in communication with a cylinder of the compression mechanism 1d. The other end of the suction pipe 1g is connected to the fluid reservoir container 1h. The fluid reservoir container 1h has a function as a muffler for reducing the noise of the refrigerant flowing into the compressor 100. Further, the fluid reservoir container 1h also has a function as an accumulator capable of accumulating liquid refrigerant. One end of the fluid reservoir container 1h is connected to the suction pipe 1g.

(Compression Mechanism 1d)

The compression mechanism 1d is configured to compress refrigerant supplied via the fluid reservoir container 1h and the suction pipe 1g, and release compressed refrigerant into the airtight container 1. The compression mechanism 1d is mounted to an inner surface of the lower shell 1a2. The compression mechanism 1d includes a cylinder configured to compress refrigerant supplied from the suction pipe 1g, a piston configured to slidably rotate in the cylinder, and other members. The piston is connected to the shaft 1c, and is configured to move eccentrically in the cylinder. Bearings 1e for rotatably supporting the shaft 1c are provided to the compression mechanism 1d on an upper end surface side and a lower end surface side thereof.

(Electric Motor 1b)

The electric motor 1b includes the shaft 1c having a lower end side connected to the bearings 1e of the compression mechanism 1d, the rotor 3 to which the shaft 1c is fixed and which is configured to transmit its own rotation to the shaft 1c, and the stator 2 on which windings 6 a plurality of phases are wound. The shaft 1c is fixed to the rotor 3 at an upper side of the connection position of the compression mechanism 1d, and is configured to rotate along with the rotation of the rotor 3, to thereby rotate the piston of the compression mechanism 1d. The rotor 3 includes a permanent magnet (not shown), and is rotatably supported by the shaft 1c with a preset clearance from the inner side of the stator 2.

The stator 2 is configured to rotate the rotor 3, and is arranged so that an outer peripheral surface of the stator 2 is fixed to an inner peripheral surface of the lower shell 1a2. The stator 2 includes a core 5 formed of a plurality of magnetic steel sheets or the like, the insulator 7 mounted on the core 5, and the winding 6 wound in a plurality of layers on the core 5 via the insulator 7. The core 5 is formed by laminating a plurality of magnetic steel sheets into layers and arranging a plurality of those layers in an annular shape. The insulator 7 used for insulating between the windings 6 and the core 5 is mounted on the core 5.

The insulator 7 is formed of a resin, for example, so that the windings 6 and the core 5 are insulated from each other. In this case, a side of the compression mechanism 1d of the insulator 7 is referred to as an insulator lower portion 7a, and the side of the upper shell 1a1 of the insulator 7 is referred to as an insulator upper portion 7b. In other words, the portion positioned on the lower side of the lower end surface of the core 5 is the insulator lower portion 7a, and the portion positioned on the upper side of the upper end surface of the core 5 is the insulator upper portion 7b.

A cavity portion (not shown) is formed in the insulator upper portion 7b. Further, a mag-mate terminal 8 connected to a lead wire 9 to be used for supplying electricity in a U-phase, a V-phase, and a W-phase is embedded in the insulator upper portion 7b. As illustrated in FIG. 2, the U-phase, the V-phase, and the W-phase are electrically connected to each other via a jumper wire 10.

The windings 6 are wound in a plurality of layers on the core 5 via the insulator 7. When current is supplied to the windings 6, the stator 2 functions as an electromagnet, which interacts with the permanent magnet arranged in the rotor 3, to thereby produce the rotational force of the rotor 3.

(Discharge Pipe 1f)

The discharge pipe 1f is a pipe for discharging high-temperature, high-pressure refrigerant that has been compressed by the compression mechanism 1d and that is in the airtight container 1. One end of the discharge pipe 1f is connected to a four-way valve (not shown) to be used for turning over (switching) passages. The other end of the discharge pipe 1f is connected to the upper shell 1a1 so as to communicate the interior with the exterior of the airtight container 1.

[Detailed Description of Stator 2]

Figure 4:
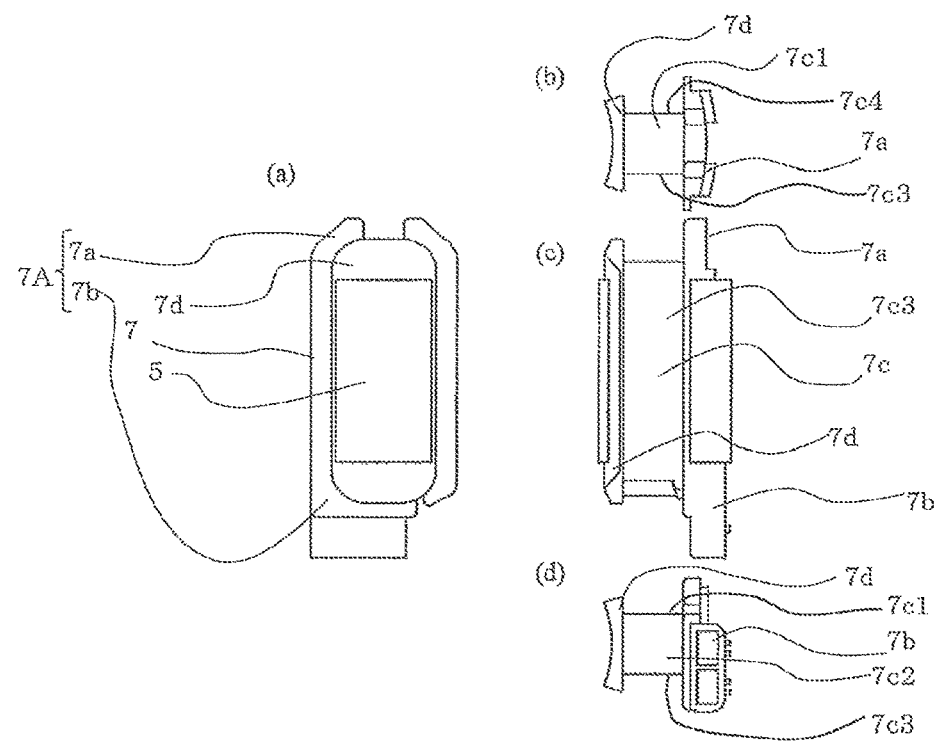
FIG. 4 are schematic configuration example diagrams of an insulator and the like mounted on the stator illustrated in FIG. 2.
Figure 5:
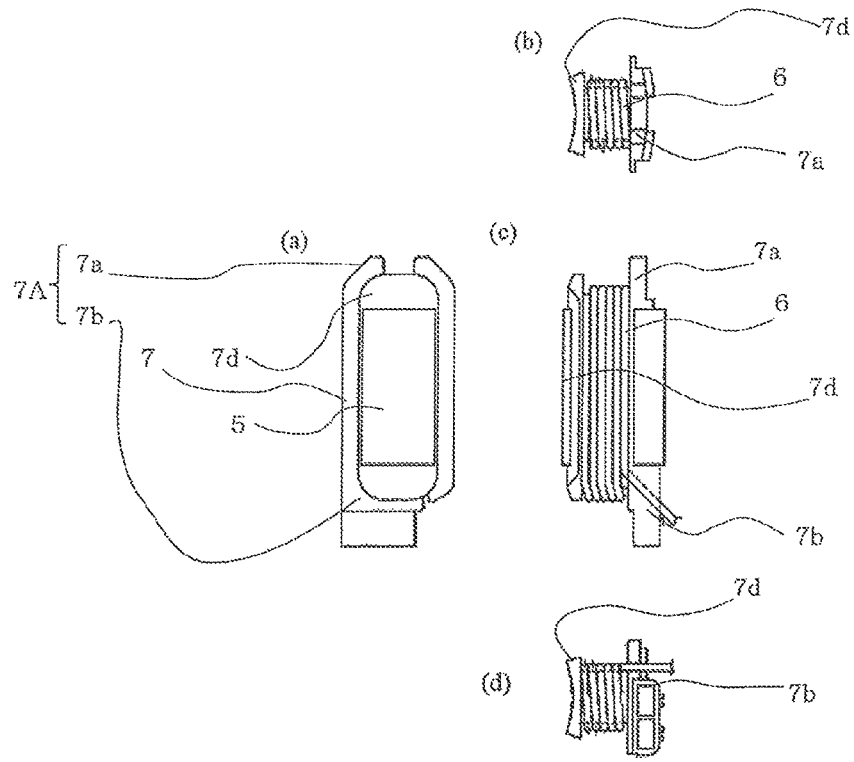
FIG. 5 are schematic configuration example diagrams of a state in which windings are wound on the insulator illustrated in FIG. 3.

FIG. 4 are schematic configuration example diagrams of the insulator 7 and other members mounted on the stator 2. FIG. 5 are schematic configuration example diagrams of a state in which the winding 6 is wound on the insulator 7. Note that, FIG. 4(a) and FIG. 5(a) are diagrams illustrating the insulator 7 and the like are viewed from an inner peripheral surface side of the stator 2, FIG. 4(b) and FIG. 5(b) are diagrams illustrating the insulator 7 and the like viewed from a lower side (the side of the compression mechanism 1d) of the stator 2, FIG. 4(c) and FIG. 5(c) are diagrams illustrating the insulator 7 and the like viewed from a side surface side of the insulator 7, and FIG. 4(d) and FIG. 5(d) are diagrams illustrating the insulator 7 and the like viewed from an upper side (he side of the upper shell 1a1) of the stator 2. The insulator 7 and the windings 6 are now described with reference to FIG. 4 and FIG. 5.

(Insulator 7)

The insulator 7 includes, in addition to the insulator lower portion 7a and the insulator upper portion 7b forming a part of the outer peripheral side of the insulator 7, a winding-base portion 7c, which is a portion on which the windings 6 are wound, and an inner peripheral portion 7d, which has an inner peripheral surface facing the outer peripheral surface of the rotor 3 and an outer peripheral surface facing the windings 6. Note that, in the following description, the outer peripheral-side portion of the insulator 7, including the insulator lower portion 7a and the insulator upper portion 7b, is referred to as an outer peripheral portion 7A.

Thus, the insulator 7 includes the outer peripheral portion 7A, the winding-base portion 7c, and the inner peripheral portion 7d.

The winding-base portion 7c has a radially inner side connected to the inner peripheral portion 7d and a radially outer side connected to the outer peripheral portion 7A. The winding-base portion 7c is formed so as to cover a part of a portion referred to as the tooth (not shown) of the core 5. In this case, the dimension from the right side to the left side on the drawing sheet of FIG. 4(a) (the dimension from the upper side to the lower side in FIG. 4(b) and FIG. 4(d)) is the width dimension. When the winding-base portion 7c is viewed in a perpendicular cross-section, the dimension in the perpendicular direction is longer than the width dimension. Therefore, the surface of the winding-base portion 7c corresponding to the dimension in the perpendicular direction is defined as a longitudinal surface, and the surface of the winding-base portion 7c corresponding to the width dimension is defined as a transverse surface.

A first transverse surface 7c1 (upper surface) forming a lower end surface of the winding-base portion 7c and a second transverse surface 7c2 (lower surface) forming an upper end surface of the winding-base portion 7c are formed on the winding-base portion 7c. Note that, the first transverse surface 7c1 and the second transverse surface 7c2 are opposite surfaces to each other. Further, a first longitudinal surface 7c3 (side surface) forming a side surface of the winding-base portion 7c and a second longitudinal surface 7c4 (side surface) formed at a position facing the first longitudinal surface 7c3 are formed on the winding-base portion 7c. Note that, the first longitudinal surface 7c3 and the second longitudinal surface 7c4 are opposite surfaces to each other. Thus, the first transverse surface 7c1, the second transverse surface 7c2, the first longitudinal surface 7c3, and the second longitudinal surface 7c4 are formed as outer peripheral surfaces on the winding-base portion 7c.

The first longitudinal surface 7c3 and the second longitudinal surface 7c4 are formed at the end portions of the first transverse surface 7c1 and the second transverse surface 7c2. On the first longitudinal surface 7c3 and the second longitudinal surface 7c4, the windings 6 are wound in parallel in a direction from the first transverse surface 7c1 side toward the second transverse surface 7c2 side. On the other hand, on one of the first transverse surface 7c1 and the second transverse surface 7c2, the winding 6 is wound at an angle in the radial direction of the stator 2, and the winding 6 of the inner layers and the winding 6 of the outer layers adjacent to the inner layers cross each other. On the other of the first transverse surface 7c1 and the second transverse surface 7c2, the windings 6 are wound in parallel in a direction from the first longitudinal surface 7c3 side toward the second longitudinal surface 7c4 side. In other words, at one of the first transverse surface 7c1 and the second transverse surface 7c2, the pitch of the windings 6 is advanced by one.

The inner peripheral portion 7d is formed so that the inner surface of the inner peripheral portion 7d faces the outer peripheral surface of the rotor 3, and the outer peripheral surface of the inner peripheral portion 7d faces the windings 6. The inner peripheral portion 7d, which is connected to a portion of the winding-base portion 7c that is on a radially inner side of the stator 2, is formed so as to extend vertically. The inner peripheral portion 7d is used to ensure that the windings 6 wound on the winding-base portion 7c does not fall off.

(Windings 6)

The windings 6, which are wound in a plurality of layers around the winding-base portion 7c of the insulator 7, are formed of copper wire, for example. The windings 6 are wound in a manner such that the windings 6 are offset from each other in a pitch direction for each turn around the winding-base portion 7c of the insulator 7. In this case, the pitch direction is a direction parallel to a direction from the radially outer side of the stator 2 to the radially inner side of the stator 2. After a given arbitrary layer of the winding 6 has been wound in an offset manner in the pitch direction from the radially inner side to the radially outer side, the next layer following the arbitrary layer is wound in an offset manner in the pitch direction from the radially outer side to the radially inner side. Then, the next layer after that layer is wound in an offset manner in the pitch direction from the radially inner side to the radially outer side. This operation is subsequently repeated, and as a result, the windings 6 are wound on the insulator 7. For example, in FIG. 6 referred to below, the odd-numbered layers are wound from the radially inner side to the radially outer side, and the even-numbered layers are wound from the radially outer side to the radially inner side.

In this case, the windings 6 may be wound by skipping one pitch or more. Further, the winding 6 wound in an offset manner from the radially inner side to the radially outer side and the winding 6 wound in an offset manner from the radially outer side to the radially inner side may both be present in the same layer. These specifics are described in more detail below with reference to FIG. 6 to FIG. 8.

[Detailed Configuration of Windings 6]

Figure 6:
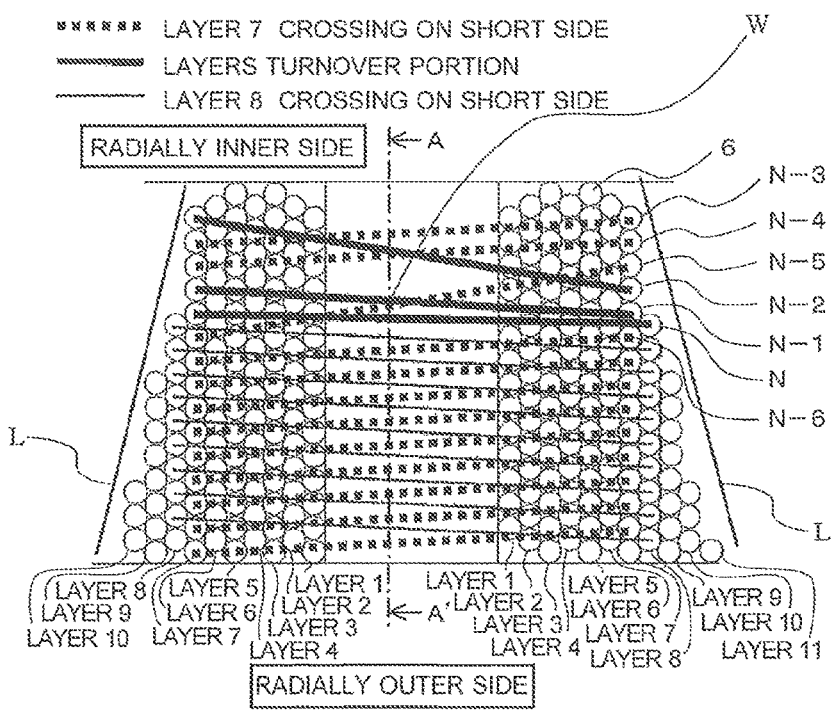
FIG. 6 is an illustration of the windings wound on the insulator of the electric motor according to the embodiment of the present invention.
Figure 7:
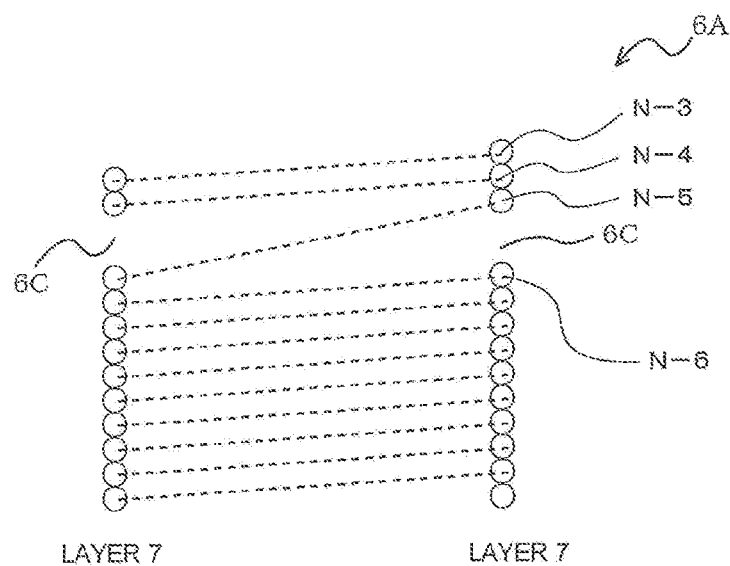
FIG. 7 is an illustration illustrating a first winding portion of the windings illustrated in FIG. 6 and a gap.
Figure 8:
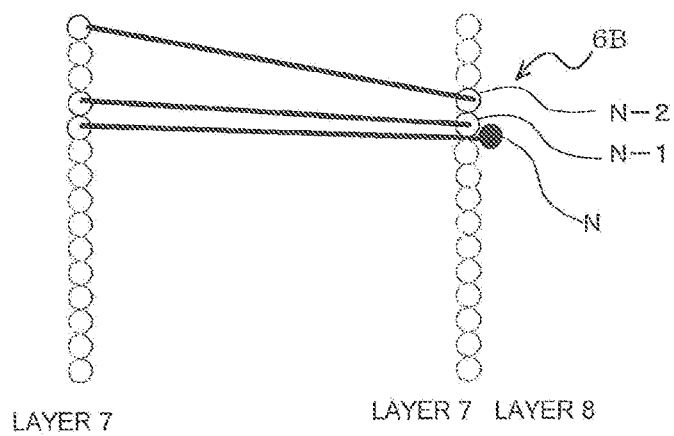
FIG. 8 is an illustration illustrating a second winding portion of the windings illustrated in FIG. 6.

FIG. 6 is an illustration of the winding 6 wound on the insulator 7 of the electric motor 1b according to this embodiment. FIG. 7 is an illustration illustrating a first winding portion 6A of the winding 6 illustrated in FIG. 6 and a gap 6C. FIG. 8 is an illustration illustrating a second winding portion 6B of the windings 6 illustrated in FIG. 6. Note that, lines L illustrated in FIG. 6 indicate the range within which the winding 6 is wound. The reason that the winding 6 is wound within this range is because if layers of the windings 6 are arranged beyond those lines, those layers interfere with the windings 6 wound on an adjacent insulator 7, thus harming the reliability of the electric motor 1b. The configuration of the windings 6 is now described in more detail with reference to FIG. 6 to FIG. 8.

FIG. 6 to FIG. 8 are cross-sectional diagrams of the winding 6 and the insulator 7 in the plane parallel to the radial direction of the stator 2. Further, the dotted lines illustrated in FIG. 6 and FIG. 7 indicate the winding 6 that is wound on the first transverse surface 7c1 and that is in the seventh layer of the windings 6. The winding 6 indicated by the dotted lines is the first winding portion 6A wound from the radially outer side of the stator 2 to the radially inner side of the stator 2 so as to form the gap 6C dimensioned to one pitch or more of the winding 6 at a preset position.

Further, the winding 6 indicated by the thicker solid lines in FIG. 6 and FIG. 8 is the second winding portion 6B, which is continuous from the first winding portion 6A and which is wound from the radially inner side of the stator 2 to the radially outer side of the stator 2 so as to fill in the gap 6C formed by the first winding portion 6A. Thus, the winding 6 of the seventh layer is formed of the first winding portion 6A and the second winding portion 6B. Note that, as illustrated in FIG. 6, the portion of the first winding portion 6A that is further to the radially inner side of the stator 2 than the gap 6C formed by the first winding portion 6A and the second winding portion 6B are wound to cross each other. In other words, the second winding portion 6B is wound on the outer side of the first winding portion 6A, and crosses the first winding portion 6A.

The thickness of the windings 6, which cross each other at the first winding portion 6A and the second winding portion 6B, increases in the shaft 1c direction at the portion where the windings 6 cross each other. In other words, when viewed in cross-section along the line A-A' in FIG. 6, the thickness of the second winding portion 6B (thicker solid lines in FIG. 6) increases in the shaft 1c direction, which causes the second winding portion 6B to protrude from the seventh layer side toward the eighth layer side. The thicker portion acts as a wall (anti-unwinding wall W) for suppressing unwinding of the windings 6 at the winding start of the eighth layer.

Thus, the portion of the second winding portion 6B that is immediately before the turnover (switch) to the eighth layer ((n+1)th layer) protrudes toward the eighth layer ((n+1)th layer) side at the position at which the second winding portion 6B crosses the first winding portion 6A to prevent the winding 6 immediately after the turnover (switch) to the eighth layer ((n+1)th layer) from deviating to the radially inner side of the stator 2.

Various winding methods for the windings 6 are now described.

(1) Examples of the method of winding the windings 6 on the insulator 7 of the stator 2 may include a concentrated winding method, in which the winding 6 is wound on one insulator 7 in a concentrated manner, and a distributed winding method, in which the winding 6 is wound around a plurality of teeth. (2) The winding 6 wound on the insulator 7 have a long side in a direction parallel to the shaft 1c, and a short side in a direction orthogonal to the shaft 1c. In winding the winding 6 on the insulator 7, the windings 6 are offset in the radial direction of the stator 2 on any one of the long side and the short side. When the windings 6 are offset on the long side of the insulator 7 (first longitudinal surface 7c3 and second longitudinal surface 7c4), the windings 6 from two layers adjacent on the long side cross each other. This method is referred to as a long-side crossing method. On the other hand, when the turns of winding 6 are offset on the short side of the insulator 7, the winding 6 of one layer crosses the winding of a layer adjacent to the one layer on the short side. This method is referred to as a short-side crossing method. In the first embodiment, an example is described in which the electric motor 1b employs a concentrated winding and a short-side crossing method.

Note that, the winding 6 indicated by the thinner solid lines in FIG. 6 is the winding 6 of the eighth layer, which is wound from the radially inner side of the stator 2 to the radially outer side of the stator 2. Thus, the winding 6 of the seventh layer (first winding portion 6A) and the winding 6 of the eighth layer cross at the first transverse surface 7c1. As a result, it can be seen that the electric motor 1b employs a short-side crossing method.

Also note that, in this embodiment, a case is described in which the winding 6 is wound by advancing the pitch by one at the first transverse surface 7c1, which is one of the first transverse surface 7c1 and the second transverse surface 7c2. However, the present invention is not limited to this. The windings 6 only need to be advanced by one pitch for each turn, and hence, for example, the windings 6 may be advanced by a ½ pitch at the first transverse surface 7c1 and a ½ pitch at the second transverse surface 7c2. When the winding 6 is advanced by a ½ pitch at the first transverse surface 7c1 and a ½ pitch at the second transverse surface 7c2, the windings 6 of adjacent layers on the inner side and the outer side cross each other at both the first transverse surface 7c1 and the second transverse surface 7c2. Thus, the reason for winding the windings 6 of the inner layers at an angle and winding the windings 6 of the outer layers at an angle so as to cross the inner layer is to increase the thickness of the winding 6 in the shaft 1c direction so that the windings 6 wound on the adjacent insulators 7 do not interfere with each other. In other words, the dimension of the shape of the winding 6 increases in a thickness direction to be similar to a cylindrical shape, in order to make it easier to obtain a sufficient winding space factor.

Further, in this embodiment, an example employing a method in which crossing is on the short side is described. However, the gap 6C may also be formed on the long side by employing a method in which crossing is on the long-side.

As illustrated in FIG. 6, the winding 6 is wound on the winding-base portion 7c of the insulator 7 for 11 layers. Further, the winding 6 is formed so that the number of turns decreases from the innermost layer to the outermost layer. Specifically, from the first layer, which is the innermost layer, to the seventh layer, the windings 6 are wound generally across the whole stator 2 (insulator 7) from the radially outer side to the radially inner side. From the eighth layer to the eleventh layer, the number of turns decreases as the layer number increases. For example, comparing the seventh layer and the eighth layer, the number of turns is approximately 15 at the seventh layer, but, at the eighth layer, the number of turns is approximately 10, which is approximately five turns less. Employing such a configuration prevents the windings 6 wound on the adjacent insulators 7 from interfering with each other.

As illustrated in FIG. 6 to FIG. 8, the gap 6C is formed at an intermediate portion of the tooth, namely, at a position in an intermediate portion of the winding-base portion 7c of the insulator 7. In this case, the term "intermediate portion" refers to a portion between the radially innermost side and the radially outermost side of the tooth (insulator 7), not to the radially innermost side and the radially outermost side of the tooth (insulator 7), but. Further, the gap 6C is formed at a position turning over (switching) from the seventh layer to the eighth layer. In other words, the gap 6C is formed at a position adjacent to the portion at which the seventh layer finishes being wound and the eighth layer starts being wound (see N in FIG. 8).

Thus, the gap 6C is formed at a position of an intermediate portion of the tooth in the radial direction of the stator 2, at which the winding 6 is turned over (switches) from an n-th layer to an (n+1)th layer (n being an integer of 1 or more). However, the gap 6C is a portion that is filled by the second winding portion 6B being wound therein. As a result, when the electric motor 1b has been manufactured, the gap 6C no longer exists. Note that, in this embodiment, an example is described in which the gap 6C has a dimension of two pitches of the windings 6.

Next, the sequence for winding the winding 6 is described with reference to FIG. 6 to FIG. 8.

The winding 6 of the seventh layer is wound from the radially outer side of the stator 2 to the radially inner side of the stator 2 so as to form the gap 6C dimensioned to one pitch or more at a preset position of the windings 6 of the seventh layer. This step is referred to as a gap forming step. Specifically, the windings 6 are wound about ten times in a direction from the radially outer side of the stator 2 to the radially inner side of the stator 2 (see N-6 in FIG. 7). Next, the winding 6 is wound so as to form the gap 6C dimensioned to two pitches (see N-5 in FIG. 7), and then the windings 6 are further wound about two times from the radially outer side of the stator 2 to the radially inner side of the stator 2 (see N-3 and N-4 in FIG. 7).

Next, the windings 6 are wound from the radially inner side of the stator 2 to the radially outer side of the stator 2 so as to fill in the gap 6C formed in the gap forming step and so as to cross the windings 6 wound in the gap forming step. This step is referred to as a gap filling step. Specifically, the windings 6 are wound two times in a direction from the radially inner side of the stator 2 to the radially outer side of the stator 2 so as to fill in the gap 6C (see N-2 and N-1 in FIG. 8). As a result, the winding 6 wound in this gap forming step cross the windings 6 wound in the gap forming step, causing the thickness of the winding 6 to increase in the shaft 1c direction at the crossing portion. The winding 6 indicated by N-1 act as a wall (anti-unwinding wall W) for suppressing unwinding of the windings 6 at the winding start end of the eighth layer indicated by N.

The winding 6 of the eighth layer is wound immediately after the winding 6 has been wound so as to fill in the gap 6C in the gap filling step. This step is referred to as a layer turnover step. Specifically, the windings 6 are wound so that the start end of the windings 6 of the eighth layer abuts the windings 6 wound so as to fill in the gap 6C formed in the gap filling step (see N in FIG. 8).

[Effects of Electric Motor 1b According to this Embodiment]

Figure 9:
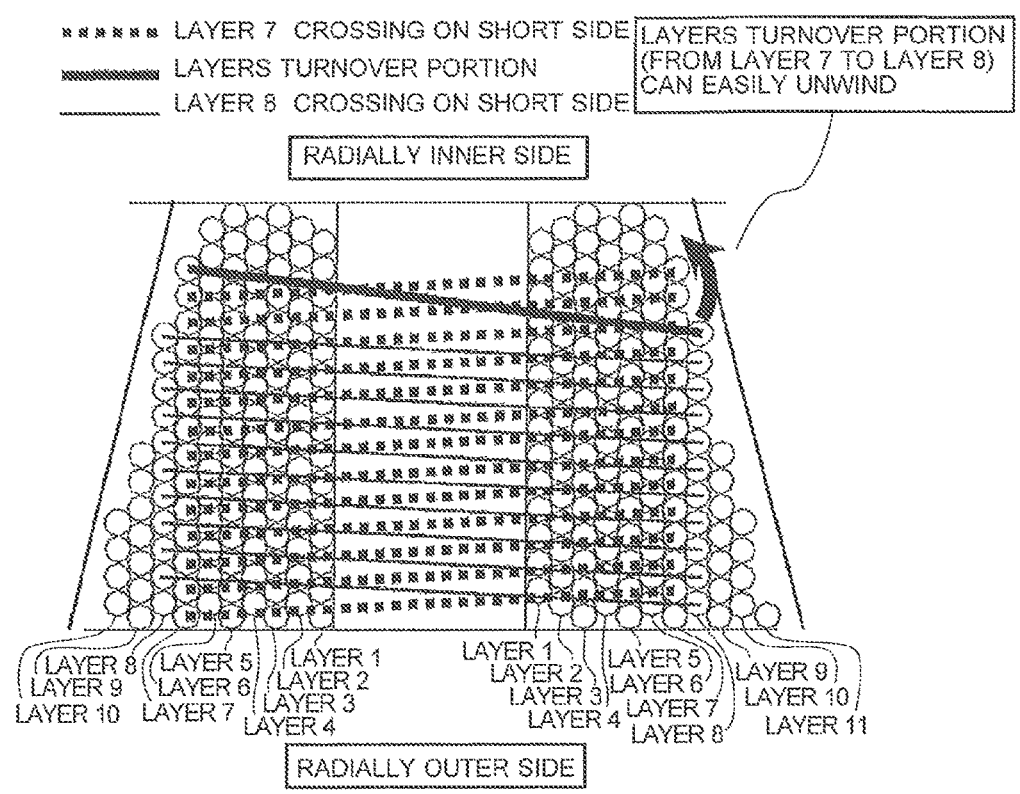
FIG. 9 is an illustration regarding a related-art method of winding windings.

FIG. 9 is an illustration regarding a related-art method of winding windings. As illustrated in FIG. 9, for example, it can be seen that there is a position at which the start of the windings 6 of the eighth layer, which is the portion at which layers of the winding 6 turn over (switch), crosses the windings 6 of the previous layer (seventh layer). At this position, the fixing force of the windings 6 is insufficient due to the increased thickness as a result of crossing, and hence the windings 6 at this position are susceptible to unwinding.

In this embodiment as well, the thickness of the windings 6 increases in the shaft 1c direction by winding the winding 6 of adjacent inner layer and outer layer on the first transverse surface 7c1 at an angle to each other so that the windings 6 of both layers cross each other. In this case, the first winding portion 6A and the second winding portion 6B cross each other, and the second winding portion 6B passes over a part of the first winding portion 6A. In other words, a portion of the second winding portion 6B is filled in the gap 6C, but the thickness of the portion of the second winding portion 6B crossing the first winding portion 6A increases in the shaft 1c direction. Stated another way, the thickness of the turn of the winding 6 immediately before the winding layer switches (see N-1 in FIG. 6) increases in the shaft 1c direction.

As a result, the turn of the winding 6 at which the winding layer switches (see N in FIG. 6) is wound on the insulator 7 while following the portion of increased thickness produced by the immediately previous turn of the windings 6 (see N-1 in FIG. 6). Further, the portion of increased thickness (or "increased thickness portion") of the immediately previous turn of the windings 6 (see N-1 in FIG. 6) serves as a wall (anti-unwinding wall W) for suppressing the turn of the windings 6, at which the winding layer switches (see N in FIG. 6), from unwinding toward the radially inner side of the stator 2. As a result, the electric motor 1b according to this embodiment suppresses the occurrence of unwinding. In such a winding arrangement, the turn of the windings 6 indicated by N-1 and the turn of the winding 6 indicated by N-5 cross each other in the cross-section A-A', and the thickness at the crossing portion increases in the shaft direction. The increased thickness portion of the winding 6 in the shaft 1c direction indicated by N-1 acts as an anti-unwinding wall W for suppressing the windings 6 at the turn indicated by N in the cross-section A-A' from unwinding toward the radially inner side.

Further, the turn indicated by N-5 of the first winding portion 6A crosses not only the turn indicated by N-1 of the second winding portion 6B but also the turn indicated by N-2. As a result, even if the turn indicated by N of the winding 6, which is the start end of the eighth layer, rises beyond the anti-unwinding wall W formed by the turn indicated by N-1 of the windings 6, unwinding past the winding 6 indicated by N-2 toward the radially inner side is suppressed by the anti-unwinding wall W formed by the windings 6 indicated by N-2.

The electric motor 1b according to this embodiment can suppress an increase in the design complexity of the stator 2 without using a method such as that disclosed in Patent Literature 1, in which the windings of adjacent cores serve as an anti-unwinding wall.

In the electric motor 1b according to this embodiment, the winding 6 and the insulator 7 are not fixed to each other by, for example, impregnating the winding 6 and the insulator 7 with varnish, by integrally molding the windings 6 and the insulator 7 together by resin molding, or by adhering the windings 6 and the insulator 7 to each other with an adhesive or the like, and hence, an increase in manufacturing costs can be suppressed by the amount that such a process may cost.

In this embodiment, an example is described in which the dimension of the gap 6C is equal to an amount of two pitches of the windings 6. However, the present invention is not limited to this. The gap 6C may have a dimension of one pitch or three or more pitches. Note that, increasing the dimension of the gap 6C has the benefit that it is easier to wind the windings 6, because the second winding portion 6B of the windings 6 can be arranged more easily in the gap 6C. On the other hand, when the dimension of the gap 6C is decreased, it may be more difficult to wind the winding 6, because it is more difficult to arrange the second winding portion 6B of the windings 6 in the gap 6C. However, as a result, the thickness of the windings 6 increases on the shaft 1c side. There is thus the advantageous effect that unwinding of the winding 6 at the winding start end of the eighth layer can be more reliably suppressed.

REFERENCE SIGNS LIST

1 airtight container 1a1 upper shell 1a2 lower shell 1b electric motor 1c shaft 1d compression mechanism 1e bearing 1f discharge pipe 1g suction pipe 1h container 2 stator 3 rotor 5 core 6 winding 6A first winding portion 6B second winding portion 6C gap 7 insulator 7A outer peripheral portion 7a insulator lower portion 7b insulator upper portion 7c winding-base portion 7c1 first transverse surface 7c2 second transverse surface 7c3 first longitudinal surface 7c4 second longitudinal surface

7d inner peripheral portion 8 mag-mate terminal 9 lead wire 10 jumper wire 100 compressor W anti-unwinding wall

The invention claimed is:

1. An electric motor including a stator, the stator including a core, the core including a tooth on which a winding is wound at a preset pitch to form a plurality of layers of the winding, the winding of one of the layers being angled to the winding of another one of the layers adjacent to the one of the layers, wherein an n-th layer of the winding comprises:
a first winding portion wound from a radially outer side of the stator to a radially inner side of the stator with a gap between one turn and another at a preset position, the gap being dimensioned to one pitch or more of the winding; and
a second winding portion wound from the radially inner side of the stator to the radially outer side of the stator in a continuous manner from the first winding portion to fill in the gap, the second winding portion crossing the first winding portion, the gap is at a position at an intermediate portion of the tooth in a radial direction of the stator, the position being a position at which the winding turns over from the n-th layer to an (n+1)th layer, a first section of the first winding portion is positioned at a radially inner side of the gap on the stator, and the first section of the first winding portion is wound crosswise to the second winding portion in the n-th layer of the winding, and the second winding portion crosses a second section of the first winding portion, wherein the second section is wound to form the gap such that the gap has a dimension of two pitches or more, and the second winding portion protrudes toward the (n+1)th layer to form two anti-unwinding walls or more.

2. The electric motor of claim 1, wherein the (n+1)th layer includes a smaller number of turns of winding than the n-th layer.

3. A compressor, comprising the electric motor of claim 1.

4. A method of manufacturing an electric motor including a stator, the stator including a core, the core including a tooth formed of a magnetic steel sheet on which a winding is wound at a preset pitch to form a plurality of layers of the winding, the winding of one of the layers being angled to the winding of another one of the layers, which is adjacent to the one of the layers, the method comprising:

winding a first winding portion of an n-th layer from a radially outer side of the stator to a radially inner side of the stator with a gap between one turn and another at a preset position, wherein the gap has a dimension of two pitches or more of the winding; and winding a second winding portion of the n-th layer from the radially inner side of the stator to the radially outer side of the stator in a continuous manner from the first winding portion to fill in the gap, wherein the second winding portion crosses the first winding portion, a gap forming step of winding the winding of the n-th layer from a radially outer side of the stator to a radially inner side of the stator so that the gap is formed at an intermediate portion of the tooth in a radial direction of the stator in the winding of the n-th layer;

wherein the gap forming step includes:

positioning a first section of the first winding portion at a radially inner side of the gap on the stator, and winding the first section crosswise to the second winding portion in the n-th layer of the first winding portion, and in the second winding portion, crossing a second section of the first winding portion, wherein the second section is wound to form the gap, and a gap filling step of winding the winding from the radially inner side of the stator to the radially outer side of the stator to fill in the gap formed in the gap forming step and cross the winding wound in the gap forming step and protruding the second winding portion toward an (n+1)th layer to form two anti-unwinding walls or more; and a layer turnover step of winding the winding with a winding start end of the winding of the (n+1)th layer being in abutment with the winding wound to fill in the gap formed in the gap filling step.

* * * * *